United States Patent Office 3,171,296
Patented Mar. 2, 1965

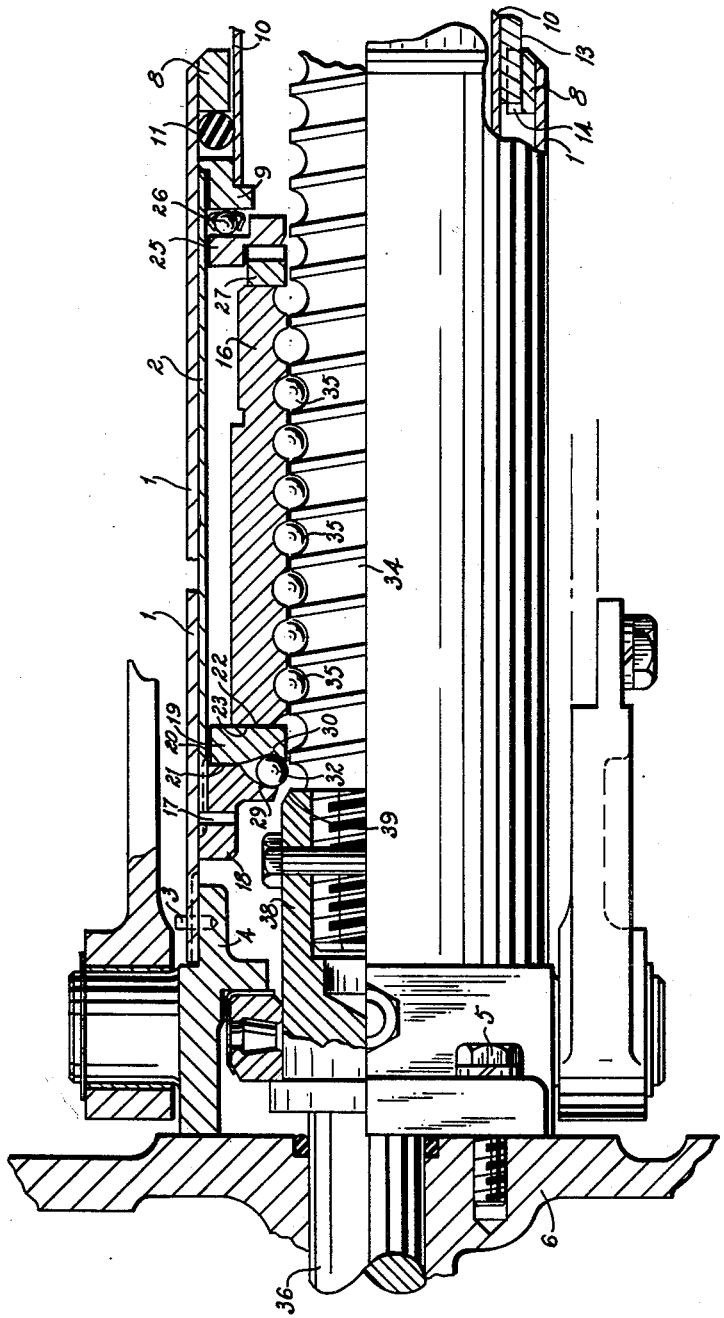
INVENTOR.
JOSEPH. S. CHEMEL
BY William S Dorman
ATTORNEY

3,171,296
BALL SCREW DRIVE FOR TWO RELATIVELY TELESCOPING MEMBERS WITH MEANS FOR PREVENTING OVERTRAVEL IN BOTH DIRECTIONS
Joseph S. Chemel, Tulsa, Okla., assignor to Auto Crane Company, Tulsa, Okla., a corporation of Oklahoma
Filed Nov. 16, 1962, Ser. No. 238,256
5 Claims. (Cl. 74—424.8)

The present invention relates to a drive means for moving one of two telescopically arranged members with relation to the other. More particularly, this invention pertains to a drive of the ball screw type wherein means are provided for preventing overtravel in both directions.

The existence of relatively telescoping members is well known and the means for moving one telescoping member with respect to another are well recognized in the art. These means can be mechanical, hydraulic or electrical. Also, various means have been employed and various other means have been proposed in association with the drive means to prevent overtravel of one telescoping member with respect to the other in one or both directions of movement. Mechanical stops, cams, detents, micro-switches, photo-electric eyes, hydraulic valves and various combinations of the foregoing have been employed and/or proposed as such overtravel preventing means. As will hereinafter more fully appear, the present invention provides a ball screw drive with means for preventing overtravel in both directions, which is simpler and more efficent than any such means heretofore employed or proposed.

Purely by way of illustration, and not by way of limitation, the present invention may be employed quite appropriately in a crane structure having a longitudinally extending boom whose inner, and generally lower, end is telescopically and slidably received within a hollow and essentially stationary supporting member. The outer free end of the boom will be provided with a supporting structure for a sheave over which passes a cable whose lower end will be attached to a hook, or the like, for lifting objects of substantial weight. The inner and lower end of the boom has a ball nut mounted therein, said ball nut being essentially non-rotatable when the boom is between its inner and outer limits of movement. A ball screw mounted on the supporting structure and driven by a suitable motor will engage the ball screw in driving relation and will employ, of course, the conventional balls which are received between the ball screw and the ball nut.

The ball nut, at its lower or inner end, has a surface which bears against a complementary surface on an annular member operatively associated with the inner end of the lower portion of the boom structure. A resilient or spring means will also be mounted in the lower portion of the boom structure, so as to urge the ball nut in such a direction as to increase the frictional forces of engagement between the inner surface of the ball nut and the complementary surface of the annular member referred to above.

As will be set forth hereinafter in greater detail, a first stop means is provided to limit the outer movement of the boom with respect to the outer telescoping member such that any tendency to move thereafter, through continued rotation of the drive of the ball screw, will cause the spring to be compressed, thus decreasing the frictional forces of engagement between the surfaces aforesaid, thereby permitting the ball screw to rotate within the lower portion of the boom structure and preventing any further outward movement of the boom structure or, in the alternative, preventing the ball drive motor from burning out.

Conversely, a second stop means is provided to limit the inner movement with respect to the outer telescoping member in such a manner that the ball nut is engaged in a non-frictional manner to compress the spring again and to decrease likewise the frictional forces of engagement between the surfaces involved, such that the ball nut will again rotate preventing further movement and similarly preventing possible damage to the drive motor.

Therefore, it is a principal object of the present invention to provide an outer telescoping member and an inner telescoping member, a ball nut associated with the inner telescoping member, a ball screw and drive motor therefor associated with the outer telescoping member to provide relative longitudinal movement between the two telescoping members and further means provided to prevent overtravel of the inner member with respect to the outer member in both directions of movement.

Other and further objects and advantageous features of this invention will hereinafter more fully appear in connection with a detailed description of the attached drawing which represents a partial longitudinal cross-sectional view taken along the longitudinal center line of a mechanism illustrating a preferred embodiment of the present invention.

Referring to the drawing in detail, reference numeral 1 designates a hollow and non-rotating cylindrical or tubular member in which a second and inner hollow cylindrical or tubular member 2 is slidably received; the member 2 is also non-rotatable as will hereinafter more clearly appear. The tubular member 1 is secured by means of a plurality of pins 3 (only one of which is shown for the sake of simplicity), for example, to a collar 4 which, in turn, is fastened by means of bolts 5 (only one of which is shown) to a housing 6, only a portion of which is shown.

The outer tubular member 1 is shown as broken; therefore, it must be remarked that the tubular member 1 is considerably longer in longitudinal extent than the inner tubular member 2 which is slidable within the outer member 1 for a substantial distance. The open right-hand end of the tubular member 1 has secured therein a radially inwardly extending annular collar or ring 8 which, as will hereinafter appear, forms a portion of an outer stop means for the inner tubular member 2.

The (outer) right-hand end of the inner tubular member 2 has secured therein (by welding or other suitable means) a fitting 9 to which is also secured in similar fashion a tubular boom 10. An O-ring 11 is received within the interior of the outer cylindrical member 1, such that it is in surface contact or sealing relation with the inner surface of the member 1 and the outer surface of the boom 10. When the inner sleeve 2 and associated boom 10 are moved outwardly (towards the right), the fitting 9 will move therewith until the forward end of the fitting bears against the O-ring 11 tending to compress the same against the collar 8 and thereby forming a mechanical stop for the outer movement of the tube 2 and the boom 10.

Purely for purposes of explanation, and not by way of limitation, the outer end (not shown) of the boom 10 may be provided with a flat metal plate (not shown) which is secured between the sides of a sheave-supporting structure (not shown), thereby forming a portion of a crane or hoisting device. Preferably, but not by way of limitation, the sheave-supporting structure is also secured to another and lower boom section (not shown) which forms no part of the present invention, but which, in its association with the sheave-supporting structure as described above, forms a means which positively prevents rotational movement of the boom 10 and the inner tubular member 2. However, for purposes of illustration only in this application, and in the interest of completeness of disclosure, the boom 10 is shown as having a metal strip 13 attached to the lower portion thereof for substantially the entire length of the boom. The collar 8 is provided with a complementary groove or slot 14 in which the metal strip 13 is adapted to slide, thereby preventing rotation of the member 2 with respect to the member 1.

A ball nut 16, which is otherwise the conventional nut portion of a ball screw drive, is mounted in the interior of the inner member 2 and longitudinally movable therewith, as will hereinafter more fully appear. The inner or left-hand end of the tubular member 2 is suitably attached by pins, such as the pin 17, to an annular flange or adapter 18. A thrust washer 19 is mounted within the tubular member 2 in abutting relation with respect to the right-hand end of the flange 18, such that surface portion 20 of the latter is in contact with surface portion 21 of the former. The left-hand end or surface 22 of the ball nut 16 bears against the right-hand surface 23 of the thrust washer 19.

At the opposite end of the ball nut 16, another thrust washer 25 is received within the inner tubular member 2. Ball bearing means 26 are situated in the space between the outer right-hand end of the thrust washer 25 and the inner left-hand end of the fitting 9. A spring means 27 is located between the right-hand end of the ball nut 16 and the lower and inner left-hand end of the thrust washer 25. This spring means urges the ball nut 16 towards the left so as to provide continuous frictional forces of engagement between the surfaces 22 and 23 and between the surfaces 20 and 21. Actually, the spring means 27 can be constituted by a lock washer of one turn, thus defining a helical spring of the same extent.

The inner right-hand end of the flange 18 is provided with a recess 29 whose concavity is directed towards the outer or right-hand end of the overall structure. Similarly, the inner left-hand end of the thrust washer 19 is provided with a recess 30 whose concavity is directed towards the inner or left-hand end of the overall structure. A plurality of spherical members, or balls, 32 are mounted in the partially closed annular cavity formed by the recesses 29 and 30. It should be noted that the upper portion of the resulting annular cavity is somewhat convergent for a reason which will appear hereinafter more clearly.

A suitable ball screw 34 is mounted for rotation within the ball nut 16 and is provided with a plurality of conventional balls 35 which serve to complete the driving relation between the ball screw 34 and the ball nut 16 in a conventional manner. The means whereby the balls move in a continuous manner through the ball nut is considered conventional and is not shown. A shaft 36 journalled in the housing 6 is connected at its right-hand end to the ball screw 34 and at its left-hand end (not shown) to a suitable drive motor (not shown). Also associated with the ball screw is a cylindrical abutment 38 whose right-hand end is preferably chamfered as at 39. The relation between the diameter of the abutment 38 and the position of the spherical members 32 is such that as the inner tubular member 2 moves inwardly towards the left, the outer chamfered end 39 of the abutment 38 will contact the spherical members 32 forcing them upwardly or radially outwardly into the cavity formed by the recesses 29 and 30, thereby creating a wedging action between the flange 18 and the thrust washer 19 tending to cause a separation between the surfaces 20 and 21.

Although the abutment 38 has been described as being rotatable with the ball screw 34, it should be obvious that the abutment does not move longitudinally away from the housing 6 and thus, could constitute a fixed portion of the housing 6, if so desired, with the ball screw 34 being rotatable, in such event, within this modified type of abutment.

Operation

The structure described above constitutes a drive means for two telescopically movable members 1 and 2 with a means for preventing overtravel in both directions of movement. Thus, with the ball screw 34 rotating in a given direction where the tubular member 2 and associated structure therein moves in an outer or right-hand direction, when the fitting 9 reaches its outer position of movement as would be effected by the squeezing of the O-ring 11 between the fitting 9 and the collar 8, continued rotation of the ball screw 34 thereafter would tend to drive the ball nut 16 further towards the right; however, this movement of the ball nut would cause the spring 27 to be compressed in such a manner as to decrease the frictional forces of engagement between the surfaces 22 and 23 and, thereafter, the ball nut 16 would rotate within the inner member 2.

Conversely, if the ball screw 34 is rotating in an opposite direction moving the inner member 2 and its associated structure towards the left, when the abutment 38 contacts the spherical members 32 wedging them upwardly or radially outwardly into the cavity formed by the recesses 29 and 30, the resulting wedging action would tend to cause separation between the surfaces 20 and 21 and the ball nut 16 would again rotate within the inner member 2.

Thus, when the inner member 2 is moved longitudinally within the outer member 1 between its inner and outer stop means, the ball nut will not rotate because the friction that exists between the friction faces 20 and 21 and faces 22 and 23 will at all times exceed the friction between the ball nut and the ball screw. Under these conditions, the ball nut will not rotate, but will move longitudinally and in driving relation with the inner member 2. When, however, either the inner or outer stop means is reached, the compression of the spring 27 will cause a decrease in the frictional forces between the surfaces 20 and 21 or between the surfaces 22 and 23, such that the ball nut 16 will then rotate within the inner member 2, thereby preventing any further longitudinal movement thereof and, at the same time, preventing the drive motor (not shown) from burning out.

Whereas, the present invention has been described in particular relation to the drawing attached hereto, it should be understood that other and further modifications, apart from those shown or suggested herein, may be made within the spirit and scope of this invention.

What is claimed is:

1. A ball screw drive for two relatively telescoping members with means for preventing overtravel in both directions comprising a stationary hollow member, a slidable and non-rotatable member telescopically received within said stationary member for longitudinal sliding movement therein in two directions, a ball nut received within said slidable member and having a surface thereon bearing against a mating surface portion connecting with said slidable member, resilient means interacting between said ball nut and said slidable member for urging said surface of said ball nut against said surface portion, a ball screw drive including a ball screw and a plurality of balls situated between the ball nut and the ball screw for driving the ball nut and the slidable member in said two directions, first stop means adjacent one end of said stationary member for limiting the sliding movement of said slidable member in one of said two directions and for simultaneously permitting compression of said resilient means to decrease the frictional engagement between said surface of said ball nut and said surface portion so that said ball nut will rotate, and second stop means at the other end of said stationary member responsive to the movement of said slidable member in the other of said two directions for non-frictionally engaging said ball nut and tending to cause separation between said surface of said ball nut and said surface portion against the action of said resilient means so that said ball nut will rotate.

2. A ball screw drive for two relatively telescoping members with means for preventing overtravel in both directions comprising a stationary hollow cylindrical member, a slidable and non-rotatable cylindrical hollow member received within said stationary member for longitudinal sliding movement therein in two directions, a ball nut received within said slidable member and having a surface adjacent one end thereof bearing against a surface portion connecting with said slidable member, resilient means interacting between the other end of said ball nut and said slidable member for urging said surface of said ball nut against said surface portion, a ball screw drive including a ball screw and a plurality of balls situated between the ball nut and the ball screw for driving the ball nut and the slidable member in said two directions, stop means at one end of said stationary member for limiting the sliding movement of said slidable member in one of said two directions and for simultaneously permitting compression of said resilient means to decrease the frictional engagement between said surface of said ball nut and said surface portion so that said ball nut will rotate, and means at the other end of said stationary member responsive to the movement of said slidable member in the other of said two directions for creating a wedging action tending to cause separation between said surface of said ball nut and said surface portion so that said ball nut will rotate.

3. A ball screw drive for two relatively telescoping members with means for preventing overtravel in both directions comprising an outer stationary and non-rotatable hollow cylindrical member, an inner non-rotatable cylindrical member mounted within said outer member for longitudinal movement therein in two directions, a cylindrical boom structure attached to said inner member and extending outwardly through an opening at one end of said outer cylindrical member, an outer stop means at said one end of said outer member for limiting the outward movement of said inner member with respect to said outer member, an annular member secured to the inner end of said inner member and slidable therewith, a ball nut received within said inner cylindrical member and having a surface adjacent the inner end thereof bearing against a complementary surface on said annular member, an inwardly directed abutment on the outer end of said inner member, a thrust washer mounted in said inner member and spaced from said abutment, bearing means situated in the space between said thrust washer and said abutment, spring means situated between said thrust washer and the other end of said ball nut and urging said ball nut in a direction to increase the frictional forces of engagement between said ball nut and said annular member, an elongated ball screw passing through said ball nut, means for rotating said ball screw, a plurality of balls situated between said ball nut and said ball screw for placing said ball screw in driving engagement with said ball nut, an inner stop means located within said outer cylindrical member and having an outwardly extending portion adapted to exert a force against said ball nut in opposition to said spring means when said inner member is moved inwardly with respect to said outer member to an inward limiting position, whereby when said ball screw rotates in a direction to move said inner member telescopically outwardly to engage the outer stop means, said spring means will be compressed thereby decreasing the frictional engagement between the surfaces at the inner end of said ball nut so that said ball nut will rotate, and whereby when said ball screw is rotated in the opposite direction to move said inner member inwardly with respect to said outer member to the extent that said extending portion exerts a force against said ball nut, said spring means will again be compressed to decrease the frictional engagement between the surfaces at the inner end of said ball nut so that said ball nut will rotate.

4. A ball screw drive for two relatively telescoping members within means for preventing overtravel in both directions comprising an outer stationary and non-rotatable hollow cylindrical member, an inner non-rotatable cylindrical member mounted within said outer member for longitudinal movement therein in two directions, a cylindrical boom structure attached to said inner member and extending outwardly through an opening at one end of said outer cylindrical member, an outer stop means at said one end of said outer member for limiting the outward movement of said inner member with respect to said outer member, an annular flange secured to the inner end of said inner member and slidable therewith, a first thrust washer freely mounted within said inner member and having a surface bearing against a complementary surface of said annular flange, a ball nut received within said inner cylindrical member and having a surface adjacent the inner end thereof bearing against a second and complementary surface on said thrust washer, an inwardly directed abutment on the outer end of said inner member, a second thrust washer mounted in said inner member and spaced from said abutment, bearing means situated in the space between said second thrust washer and said abutment, spring means situated between said second thrust washer and the other end of said ball nut and urging said ball nut in a direction to increase the frictional forces of engagement between said ball nut and said first thrust washer and to increase at the same time the frictional forces of engagement between said thrust washer and said annular flange, an elongated ball screw passing through said ball nut, means for rotating said ball screw, a plurality of balls situated between said ball nut and said ball screw for placing said ball screw in driving engagement with said ball nut, an outwardly directed annular recess on said flange, an inwardly directed annular recess on said first thrust washer forming with said outwardly directed annular recess a partially closed cavity, a plurality of spherical members located in said cavity and projecting inwardly into the space radially inward of said cavity, an inner stop means located within said outer cylindrical member and having a cylindrically extending portion adapted to intercept the inner projecting portions of said spherical members when said inner member is moved inwardly with respect to said outer member to an inward limiting position, whereby when said ball screw rotates in a direction to move said inner member telescopically outwardly to engage the outer stop means, said spring means will be compressed thereby decreasing the frictional engagement between the surfaces at the inner end of said ball nut so that said ball nut will rotate, and whereby when said ball screw is rotated in the opposite direction to move said inner member inwardly with respect to said outer member to the extent that said extending portion contacts said spherical members, said spherical members will be wedged radially outwardly to decrease the frictional engagement between said flange and said first thrust washer so that said ball nut will rotate.

5. A ball screw drive for two relatively telescoping members with means for preventing overtravel in both directions comprising a frame structure, a stationary, non-rotatable and elongated hollow cylindrical member having an outer open end and an inner end secured to said frame structure, a non-rotatable but slidable cylindrical hollow member received within said stationary member for longitudinal sliding movement therein in two directions, said stationary member being substantially longer in the longitudinal direction than said slidable member, a cylindrical boom structure attached to one end of said slidable member and extending outwardly through the open end of said stationary member, an inwardly extending annular collar secured to said open end of said stationary member and encircling said boom, a first abutment on said slidable member at the region of attachment with said cylindrical boom, a resilient O-ring received within said stationary member and in surface engagement with the inner surface thereof and the outer surface of said cylindrical boom and constituting an outer stop means for limiting the movement of said slidable member with respect to said stationary member as said first abutment approaches said annular collar, an annular flange secured to the other end of said slidable member, a first thrust washer freely mounted within said slidable member and having a surface bearing against a complementary surface of said annular flange, a ball nut received within said slidable member and having a surface adjacent the inner end thereof bearing against a second and complementary surface on said thrust washer, a second and inwardly directed abutment on the first end of said slidable member, a second thrust washer mounted in said slidable member and spaced from said second abutment, bearing means situated in the space between said second thrust washer and said second abutment, spring means situated between said second thrust washer and the other end of said ball nut and urging said ball nut in a direction to increase the frictional forces of engagement between said ball nut and said first thrust washer and to increase at the same time the frictional forces of engagement between said thrust washer and said annular flange, an elongated ball screw passing through said ball nut, means for rotating said ball screw, a plurality of balls situated between said ball nut and said ball screw for placing said ball screw in driving engagement with said ball nut, an outwardly directed annular recess on said flange, an inwardly directed annular recess on said first thrust washer forming with said outwardly directed annular recess a partially closed cavity, a plurality of spherical members located in said cavity and projecting partially inwardly into the space radially inward of said cavity, an inner stop means located within said stationary cylindrical member and having a cylindrically extending portion adapted to intercept the inner projecting portions of said spherical members when said slidable member is moved inwardly with respect to said stationary member to an inward limiting position, whereby when said ball screw rotates in a direction to move said slidable member and said boom telescopically outwardly with respect to said stationary member to the extent that said first abutment engages the outer stop means including the O-ring and the collar, said spring means will be compressed thereby decreasing the frictional engagement between the surfaces at the inner end of said ball nut so that said ball nut will rotate, and whereby when said ball screw rotates in the opposite direction to move said slidable member inwardly with respect to said stationary member to the extent that said extending portion contacts said spherical members, said spherical members will be wedged radially outwardly to decrease the frictional engagement between said flange and said first thrust washer so that said ball nut will rotate.

References Cited by the Examiner
UNITED STATES PATENTS
2,682,780   7/54   Pickles _____ 74—424.8

DON A. WAITE, *Primary Examiner.*